(12) United States Patent
Dai et al.

(10) Patent No.: US 10,678,084 B2
(45) Date of Patent: Jun. 9, 2020

(54) DISPLAY DEVICE

(71) Applicants: K-Tronics (Suzhou) Technology Co., Ltd., Suzhou (CN); BOE TECHNOLOGY GROUP CO., LTD., Beijing (CN)

(72) Inventors: Hailong Dai, Beijing (CN); Yuan Li, Beijing (CN)

(73) Assignees: K-Tronics (Suzhou) Technology Co., Ltd., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/421,412

(22) Filed: May 23, 2019

(65) Prior Publication Data

US 2020/0133050 A1 Apr. 30, 2020

(30) Foreign Application Priority Data

Oct. 24, 2018 (CN) .......................... 2018 1 1243440

(51) Int. Cl.
*G02F 1/1335* (2006.01)
*G02F 1/1333* (2006.01)
*G02F 1/13357* (2006.01)

(52) U.S. Cl.
CPC .. *G02F 1/133504* (2013.01); *G02F 1/133308* (2013.01); *G02F 1/133605* (2013.01); *G02F 1/133603* (2013.01); *G02F 2001/133567* (2013.01)

(58) Field of Classification Search
CPC ......... G02F 1/133504; G02F 1/133605; G02F 1/133603; G02F 2001/133567; G02F 1/133308; G02F 1/133606; G02F 2001/133607; G02F 2001/133314
See application file for complete search history.

(56) References Cited

U.S. PATENT DOCUMENTS

| | | | |
|---|---|---|---|
| 2016/0131806 A1* | 5/2016 | Koshitouge | H01L 51/5275 257/40 |
| 2018/0107060 A1* | 4/2018 | Yamakawa | G02F 1/133504 |
| 2018/0283676 A1* | 10/2018 | Coo | H05K 7/2049 |

\* cited by examiner

*Primary Examiner* — Nathanael R Briggs
(74) *Attorney, Agent, or Firm* — Thomas | Horstemeyer, LLP

(57) ABSTRACT

A display device is provided in the present disclosure. The display device includes a liquid crystal panel, a diaphragm assembly, and a back plate. The liquid crystal panel has a light incident surface and a light exit surface which are oppositely disposed. The diaphragm assembly is attached to and fixed to the light incident surface of the liquid crystal panel, and configured to at least diffuse light entering the light incident surface. The back plate is disposed at a side of the diaphragm assembly away from the light incident surface of the liquid crystal panel, and configured to support the diaphragm assembly. The back plate includes a bottom plate and a side plate. The bottom plate is configured to be a flat plate structure, and oppositely disposed with the diaphragm assembly. The side plate is configured to surround the bottom plate, connected with a periphery of the bottom plate, and configured to extend to a side of the diaphragm assembly away from the liquid crystal panel in the direction toward the diaphragm assembly to support the diaphragm assembly.

15 Claims, 3 Drawing Sheets

DISPLAY DEVICE

CROSS-REFERENCE TO RELATED APPLICATIONS

The present application claims the benefit of and priority to Chinese Patent Application No. 201811243440.4, filed on Oct. 24, 2018, which is incorporated herein by reference in its entirety.

TECHNICAL FIELD

The present disclosure relates to the field of the display technology and, more particularly, to a display device.

BACKGROUND

Currently, liquid crystal display technology has been widely used. A liquid crystal display panel generally includes a liquid crystal panel and a back light source, and the liquid crystal display panel emits light to the liquid crystal panel through the back light source to display an image. In an existing liquid crystal display panel adopting a direct type back light source, the back light source usually includes a back plate, a diffusion plate, a film etc. The diffusion plate can be disposed on the back plate, and the film may be disposed on a side of the diffusion plate away from the back plate and fixed by the middle frame. The liquid crystal panel can be limited in the middle frame. Meanwhile, the side frame can be used to fix the back plate and the liquid crystal panel, shielding the middle frame.

However, the thickness of the existing liquid crystal display panels are large, and the width of the side frame is larger in order to shield the middle frame, which is disadvantageous for lighting, thinning, and side narrowing. Meanwhile, due to the influence of temperature and humidity, the film may be warped which causes the liquid crystal display panel to be prone to uneven brightness.

It should be noted that the information disclosed in the above described background only serves to enhance an understanding of the background of the present disclosure, which may include information that does not constitute related art known to those skilled in the art.

SUMMARY

According to one aspect of the disclosure, a display device is provided. The display device includes a liquid crystal panel, a diaphragm assembly, and a back plate. The liquid crystal panel has a light incident surface and a light exit surface which are oppositely disposed. The diaphragm assembly is attached to and fixed to the light incident surface of the liquid crystal panel, and configured to at least diffuse light entering the light incident surface. The back plate is disposed at a side of the diaphragm assembly away from the light incident surface of the liquid crystal panel, and is configured to support the diaphragm assembly. The back plate includes a bottom plate that is configured to be a flat plate structure, and being oppositely disposed with the diaphragm assembly; a side plate configured to surround the bottom plate and being connected with a periphery of the bottom plate, and configured to extend to a side of the diaphragm assembly away from the liquid crystal panel in the direction toward the diaphragm assembly to support the diaphragm assembly.

In an exemplary embodiment of the present disclosure, the diaphragm assembly includes a diffusion sheet and a prism sheet which are stacked or disposed to stack.

In an exemplary embodiment of the present disclosure, the diffusion sheet includes a first substrate and a diffusion layer which are stacked, or disposed to stack, and the diffusion layer includes diffusion particles.

In an exemplary embodiment of the present disclosure, the thickness of the first substrate is from 100 μm to 125 μm and the thickness of the diffusion layer is from 20 μm to 40 μm.

In an exemplary embodiment of the present disclosure, the prism sheet includes a second substrate and a prism layer which are stacked, or disposed to stack, where the prism layer includes a plurality of prism units protruded toward the light incident surface.

In an exemplary embodiment of the present disclosure, the thickness of the second substrate is from 100 μm to 125 μm and the height of the prism unit is from 20 μm to 40 μm.

In an exemplary embodiment of the present disclosure, the side plate is configured to be a flat plate structure or an arc shape plate structure protruded in a direction away from the bottom plate.

In an exemplary embodiment of the present disclosure, the back plate further includes a supporting plate configured to contact a surface of the diaphragm assembly away from the liquid crystal panel to support the diaphragm assembly, where a first side of the supporting plate is connected with a periphery of a side of the side plate away from the bottom plate, and a second side of the supporting plate protrudes from a periphery of the diaphragm assembly and the liquid crystal panel.

In an exemplary embodiment of the present disclosure, an intersection angle between the side plate and the bottom plate is an obtuse angle.

In an exemplary embodiment of the present disclosure, the bottom plate, the side plate, and the diaphragm assembly are together limited a cavity.

In an exemplary embodiment of the present disclosure, the display device further includes a light source disposed on a surface of the back plate near the diaphragm assembly and located in the cavity.

In an exemplary embodiment of the present disclosure, the display device further includes a reflective layer disposed in the cavity. The reflective layer includes a first reflective portion attached to a surface of the bottom plate near the diaphragm assembly, and a second reflective portion having a first side connected with a periphery of the first reflective portion and a second side being configured to extend to a side of the diaphragm assembly away from the liquid crystal panel in a direction away from the first reflective portion.

In an exemplary embodiment of the present disclosure, the second reflective portion is attached to the side plate or has a gap with the side plate.

In an exemplary embodiment of the present disclosure, a through hole is disposed at a position of the reflective layer corresponding to the light source to expose the light source in the cavity through the light source passing through the through hole.

In an exemplary embodiment of the present disclosure, the display device further includes a side frame configured to surround the liquid crystal panel and the diaphragm assembly, a side of the side frame being connected with the other side of the supporting plate extending out the periphery of the diaphragm assembly and the liquid crystal panel.

It should be understood that the above general description and the following detailed description are merely exemplary and explanatory and does not limit the present disclosure.

BRIEF DESCRIPTION OF THE DRAWINGS

The accompanying drawings herein are incorporated into the specification and form a part of the present specification. The embodiments of the present disclosure are shown and used to explain the principles of the present disclosure in conjunction with the specification. Understandably, the accompanying drawings described below are only some embodiments of the present disclosure, and other drawings can be obtained from these accompanying drawings without any creative effort to those skilled in the art.

DETAILED DESCRIPTION

Figure 1:
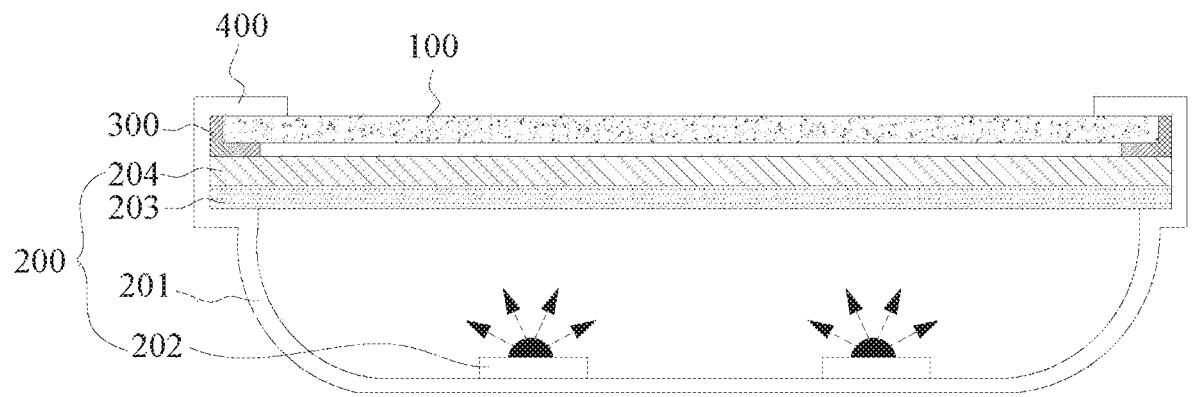
FIG. 1 is a schematic view of a display device in the related art.

Now, example embodiments will be described more comprehensively with reference to the accompanying drawings. However, example embodiments can be implemented in various manners, and it is understood that the present disclosure is not limited to the embodiments set forth herein. Rather, these embodiments are provided so that the present disclosure will be comprehensive and complete, and the concepts of the example embodiments will be comprehensively communicated to those skilled in the art. The same reference numerals in the accompanying figures are denoted the same or similar structures, thereby detailed description thereof will be omitted.

Although relative terms such as "upper" and "lower" are used in this specification to describe the relative relationship between one component of an reference numeral and another component, these terms are used in this specification only for convenience, for example, according to the direction of the example described in the accompanying drawings. It should be understood that if the device of a reference numeral is flipped upside down, the component described "upper" will become the component "lower." When a component is "upper" relative to another component, it may refer to that component being formed on the other component, or that the component is "directly" set on the other component, or that the component is "indirectly" set on the other component via another component.

The terms "one", "a/an", "this", "said", and "at least one" are used to denote the existence of one or more elements/components/etc. The terms "including" and "having" are used to denote the meaning of open inclusion and refer to the existence of additional element/component/etc. in addition to the listed element/component/etc. The terms "first", "second", etc. are used only as labels, and not as a limitation on the number of objects thereof.

In the related technology, as shown in FIG. 1, a display device includes a liquid crystal panel 100, a backlight module 200, a middle frame 300, and a side frame 400. The liquid crystal panel 100 is oppositely disposed with the backlight module 200. The backlight module 200 includes a back plate 201, a light source 202, a diffusion plate 203, and a diaphragm group 204.

Figure 2:
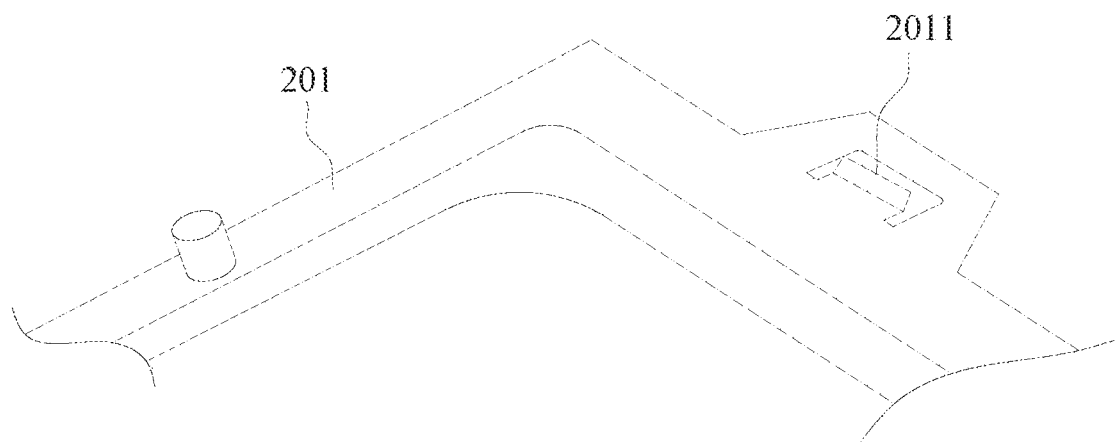
FIG. 2 is a partial view of a back plate of a back light module of a display device in the related art.

In one embodiment, the light source 202 is disposed on a surface of the back plate 201 near the liquid crystal panel 100 and can emit light to the liquid crystal panel 100. The diffusion plate 203 is disposed on a side of the back plate 201 near the liquid crystal panel 100. As shown in FIG. 2, the back plate 201 can be fixed by cooperation of a connecting lug 2011 of the back plate 201 and a gap of the diffusion plate 203. The diaphragm group 204 may be disposed on the surface of the diffusion plate 203 near the liquid crystal panel 100, and the diaphragm group 204 may be supported by the diffusion plate 203. The diaphragm group 204 may include a diffusion sheet and a prism sheet to improve the display brightness and uniformity.

The middle frame 300 can be connected to the surface of the diaphragm group 204 near the liquid crystal panel 100 by a press fit to fix the diaphragm group 204. The liquid crystal panel 100 is limited in the middle frame 300. The liquid crystal panel 100, the middle frame 300, and the diffusion plate 203 are all located inside the side frame 400 and fixed. The back plate 201 is connected with the side frame 400. The side frame 400 has a flange that extends to the light incident surface of the liquid crystal panel 100, and the middle frame 300 can be shielded by the flange.

However, the thickness of the diffuser plate 203 is in the range of 1 mm to 2.5 mm, and the thickness of the middle frame 300 is in the range of 5 to 10 mm. Moreover, in order to improve the warpage resistance deformation capability of the diaphragm group 204, the thickness of the substrate of the diffusion sheet and the prism sheet is between 188 μm and 250 μm, such that the lighting and thinning of the display device is difficult to achieve. Meanwhile, the structure of the display device is more complicated, and the installation process is increased, which results in higher production cost and lower efficiency. Moreover, light will be wasted when it passes through the diffusion plate 203, so that the brightness of the liquid crystal panel is lowered. In addition, due to the influence of the change of temperature or humidity, the diaphragm group 204 is prone to warp, such that light cannot be uniformly illuminated on the liquid crystal panel 100 after passing through the diaphragm group 204, and the uniformity of the brightness of the liquid crystal panel is lowered and further affect the screen effect. In addition, the width of the side frame 400 is caused to be larger by the portion (e.g., the flange) of the side frame 400 shielding the middle frame 300, and it is difficult to realize a narrow side frame or even no side frame.

Figure 3:
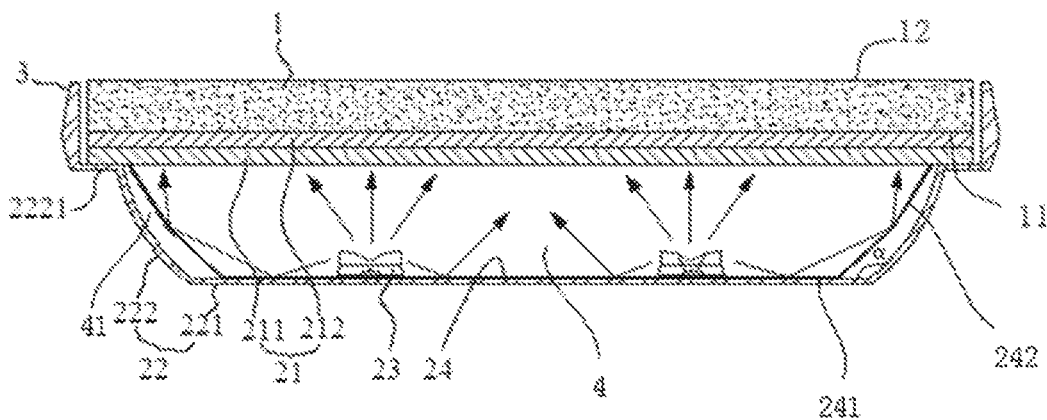
FIG. 3 is a schematic diagram of a display device of an embodiment of the present disclosure.

A display device including a liquid crystal panel 1, a diaphragm assembly 21, and a back plate 22 is provided in an embodiment of the present disclosure, as shown in FIG. 3. In the embodiment, the liquid crystal panel 1 has a light incident surface 11 and a light exit surface 12 which are oppositely disposed with each other. The diaphragm assembly 21 is attached and fixed to the light incident surface 11 of the liquid crystal panel 1, and is configured to diffuse light that at least enters the light incident surface 11. The back plate 22 is disposed on a side of the diaphragm assembly 21 away from the light incident surface 11 of the liquid crystal panel 1, and is configured to support the diaphragm assembly 21. With further reference to FIG. 3, the back plate 22 includes a bottom plate 221 and a side plate 222. The bottom plate 221 has a flat plate structure and is oppositely disposed with the diaphragm assembly 21. The side plate 222 is surrounded the bottom plate 221 and connected with the periphery of the bottom plate 221. The side plate 222 is extended to a side of the diaphragm assembly 21 away from the liquid crystal panel 1 in the direction toward the diaphragm assembly 21, and is configured to support the diaphragm assembly 21.

In a display device of an embodiment of the present disclosure, since the light incident surface 11 of the liquid crystal panel 1 is attached with the diaphragm assembly 21, the light entering the light incident surface 11 can be more uniform through the diaphragm assembly 21, so that the display brightness of the liquid crystal panel 1 is more uniform. Meanwhile, the diaphragm assembly 21 can be limited by the liquid crystal panel 1 to prevent the diaphragm assembly 21 from warping, thereby ensuring that the display brightness of the display panel is more uniform. In addition, since the diaphragm assembly 21 is attached and fixed on the light incident surface 11 of the liquid crystal panel 1, and one end of the side plate 222 is extended to a side of the diaphragm assembly 21 away from the liquid crystal panel 1 to support the diaphragm assembly 21. Therefore, the diffusion plate and the middle frame in the related art can be omitted, thereby reducing the thickness of the display device, and the side frame is not needed to shield the middle frame again, which is advantageous for reducing the width of the side frame. In addition, the elimination of the diffusion plate is also advantageous in avoiding the loss of light from the diffusion plate, which is advantageous for improving the brightness of the display device.

Hereinafter, each component of the display device of the embodiment of the present disclosure will be described in detail.

As shown in FIG. 3, the liquid crystal panel 1 may have a light incident surface 11 and a light exit surface 12, and light can enter through the light incident surface 11 and can be emitted by the light exit surface 12. The light is modulated by the liquid crystal panel 1 to display an image.

For example, the liquid crystal panel 1 may include a first polarizer, an array base plate, a liquid crystal layer, a color film base plate, and a second polarizer, wherein the array base plate and the color film base plate are oppositely disposed with each other, and the array base plate is located on a side of the color film base plate near the back plate 22. The liquid crystal layer is located between the array base plate and the color film base plate. The first polarizer is located on a side of the array base plate near the backplane 22, and the second polarizer is located on a side of the color film base plate away from the array base plate. The array base plate may include a substrate base plate and a thin film transistor (TFT) distributed on a side of the substrate base plate in the array. The first polarizer is located on a side of the substrate base plate away from the thin film transistor. The color film base plate may include a substrate and a color filter on the substrate. Of course, the liquid crystal panel 1 may further include other components, and those skilled in the art are aware of the structure and installation of the other components. Therefore, the working principle and detailed structure thereof will not be described in detail herein.

The passed light can be diverged by the diaphragm assembly 21 to improve the uniformity of the brightness of the light. Of course, the brightness can also be improved, and the shape and size of the diaphragm assembly 21 can be the same as the shape and size of the liquid crystal panel 1, and can be attached to the light incident surface 11 of the liquid crystal panel 1. The diaphragm assembly 21 can be fixed to the light incident surface 11 by bonding. For example, the diaphragm assembly 21 can be bonded to the light incident surface 11 of the liquid crystal panel 1 by the UV glue (UV curable adhesive). Of course, other adhesives may be adopted for bonding, or the diaphragm assembly 21 may be attached and fixed to the light incident surface 11 by other manners so that the liquid crystal panel 1 is configured to have a limiting function on the diaphragm assembly 21 to prevent the warpage of the diaphragm assembly 21, thereby ensuring the uniform brightness of the display device. The light incident surface 11 of the liquid crystal panel 1 may be a surface of the first polarizer away from the liquid crystal layer.

As shown in FIG. 3, in an embodiment, the diaphragm assembly 21 may include a diffusion sheet 211 and a prism sheet 212. The diffusion sheet 211 and the prism sheet 212 may be disposed to stack, and the respective numbers are not particularly limited herein. If the number of the at least one of the diffusion sheet 211 and the prism sheet 212 is plural, the diffusion sheet 211 and the prism sheet 212 may be stacked in any order, and is not particularly limited herein. Meanwhile, the liquid crystal panel 1 may be attached to the diffusion sheet 211 or the prism sheet 212.

Figure 4:
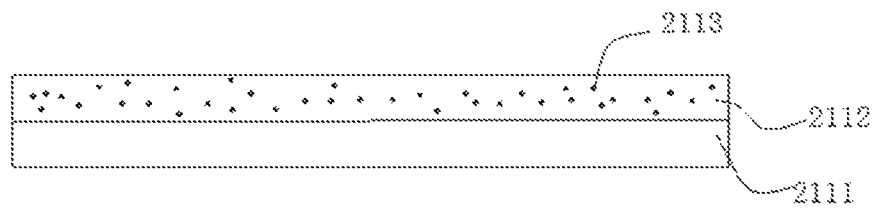
FIG. 4 is a structure schematic view of a diffusion sheet in an embodiment of the present disclosure.

As shown in FIG. 4, in an embodiment, the diffusion sheet 211 may include a first substrate 2111 and a diffusion layer 2112. The first substrate 2111 and the diffusion layer 2112 may be disposed to stack. The diffusion layer 2112 may include diffusion particles 2113. The first substrate 2111 and the diffusion layer 2112 are both transparent materials, and light can be diverged by the diffusion particles 2113 to improve the uniformity of brightness. For example, the material of the first substrate 2111 may be polyethylene terephthalate (PET) and, of course, may be other transparent materials. Since the diaphragm assembly 21 can be prevented from warping by the liquid crystal panel 1, the thickness of the first substrate 2111 can be smaller than the thickness of the substrate (188 µm-250 µm) of the diffusion layer in the related art. For example, the thickness of the first substrate 2111 is from 100 µm to 125 µm, thereby in the case of a smaller thickness, the warpage can be prevented and brightness uniformity can be ensured. Of course, the thickness of the first substrate 2111 can also be greater than 125 µm or less than 100 µm. Meanwhile, the diffusion layer 2112 may include a base material and diffusion particles 2113 doped in the base material. The base material can be a transparent resin material. The material and structure of the diffusion particles 2113 are not particularly limited herein. The thickness of the diffusion layer 2112 may be from 20 µm to 40 µm. Of course, the thickness of the diffusion layer 2112 can also be greater than 40 µm or less than 20 µm.

The diffusion sheet 211 may also be configured to be other structures as long as it can function to increase the brightness, which will not be enumerated herein.

It should be noted that if the diffusion sheet 211 is directly attached to the liquid crystal panel 1, for example, attached to the first polarizer of the liquid crystal panel 1, the surface of the diffusion sheet 211 that is bonded with the first polarizer is smooth, and the diffusion particles 2113 are not provided to ensure the bonding to be close and firming.

Figure 5:
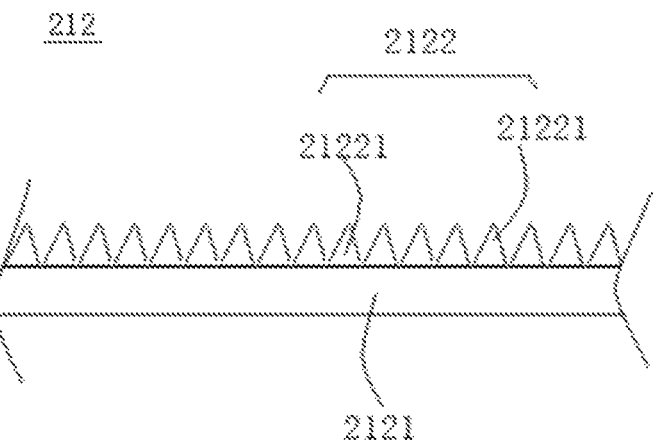
FIG. 5 is a partially enlarged schematic view of a prism sheet in an embodiment of the present disclosure.

As shown in FIG. 5, the prism sheet 212 may include a second substrate 2121 and a prism layer 2122, and the second substrate 2121 and the prism layer 2122 may be stacked or disposed to stack. For example, the material of the second substrate 2121 may be polyethylene terephthalate (PET), and, of course, also may be other transparent materials. Since the diaphragm assembly 21 can be prevented from warping by the liquid crystal panel 1, the thickness of the second substrate 2121 can be smaller than the thickness of the substrate (188 µm-250 µm) of the prism layer in the related art. For example, the thickness of the second substrate 2121 is from 100 μm to 125 μm, thereby in the case of a smaller thickness, the diaphragm assembly 21 can also be avoided from warping, and the uniform brightness of the liquid crystal panel 1 is ensured. Of course, the thickness of the second substrate 2121 can also be greater than 125 μm or less than 100 μm. The prism layer 2122 may include a plurality of prism units 21221 protruding toward the light incident surface 11 of the liquid crystal panel 1. The prism layer 2122 may be formed by a transparent resin material such as an acrylic resin, and includes a plurality of prism units 21221. The structure of the prism unit 21221 is not particularly limited herein. Light is continuously recycled to use under the action of the prism unit 21221, thereby helping to improve the brightness. The principle of the prism layer 2122 will not be described in detail herein. The height of the prism unit 21221 (i.e., the thickness of the prism layer) may be from 20 μm to 40 μm, and, of course, may be greater than 40 μm or less than 20 μm.

The prism sheet 212 may also be configured to be other structures as long as it can function to increase the brightness, and will not be enumerated herein.

As shown in FIG. 3, the display device in the embodiment of the present disclosure further includes a back plate 22 disposed at a side of the diaphragm assembly 21 away from the light incident surface 11 of the liquid crystal panel 1, and is configured to support the diaphragm assembly 21. In an embodiment, the back plate 22 includes a bottom plate 221 and a side plate 222, and the bottom plate 221 may be a flat structure and oppositely disposed with the diaphragm assembly 21. The side plate 222 is configured to surround the bottom plate 221 and is connected with the periphery of the bottom plate 221. Additionally, the side plate 222 is extended to the periphery of a side of the diaphragm assembly 21 away from the liquid crystal panel 1 in the direction toward the diaphragm assembly 21 to support the diaphragm assembly 21. The side plate 222 may be integrally formed with the bottom plate 221, engaged with the bottom plate 221, or the like. The side plate 222 is a flat plate structure or an arc shape plate structure that is swelled toward the direction away from the bottom plate 221, so that the inner wall of the side plate 222 is an outwardly concave arc surface. In an embodiment, the back plate 221 further includes a supporting plate 2221 configured to contact with the surface of the diaphragm assembly 21 away from the liquid crystal panel 1 to support the diaphragm assembly 21. Meanwhile, it also serves to limit the diaphragm assembly 21, further preventing the diaphragm assembly 21 from warping. A first side of the supporting plate 2221 is connected with a periphery of a side of the side plate 222 away from the bottom plate 221, and a second side of the supporting plate 2221 protrudes from the periphery of the diaphragm assembly 21 and the liquid crystal panel 1. The supporting plate 2221 may be formed by outwardly bending the edge of the side plate 222 away from the bottom plate 221, and also may be formed by connecting the supporting plate 2221 with the edge of the side plate 222 away from the bottom plate 221, such as by welding, bonding, or the like. The intersection angle α between the side plate 222 and the bottom plate 221 is an obtuse angle, that is, the bottom plate 221 and the side plate 222 are formed a bowl-like structure (as shown in FIG. 3). The supporting plate 2221 and the diaphragm assembly 21 can be fixedly connected, such as bonding by optical glue or other transparent glue, thereby achieving a fixing connection of the liquid crystal panel 1 and the back plate 22.

As shown in FIG. 3, the bottom plate 221, the side plate 222 and the diaphragm assembly 21 are together limited in a cavity 4. In an embodiment, the display device further includes a light source 23 disposed at a surface of the back plate 22 near the diaphragm assembly 21, and the light source 23 is located in the cavity 4. The light source 23 is fixed on the back plate 22 for emitting light to the liquid crystal panel 1. In an embodiment, the light source 23 is adhesively fixed to a surface of the bottom plate 221 of the back plate 22 facing the diaphragm assembly 21, and the bonding manner may be by dispensing glue or by double-sided glue bonding. Of course, it can also be fixed by other manners.

The light source 23 can be an LED light bar, and the LED light bar may include a circuit board and an LED light emitting means connected to the circuit board. Of course, the light source 23 can also be other lighting means, which will not be enumerated herein. The number of the light source 23 may be plural and each may be fixed to the back plate 22, and may emit light toward the diaphragm assembly 21.

As shown in FIG. 3, in order to improve the utilization of light, the display device of the embodiment of the present disclosure may further include a reflective layer 24 disposed in the cavity 4. The reflective layer 24 may be a lighting material. The reflective layer 24 includes a first reflective portion 241 and a second reflective portion 242. The first reflective portion 241 is attached to the surface of the bottom plate 221 near the diaphragm assembly 21. A first side of the second reflective portion 242 is connected with the periphery of the first reflective portion 241, and a second side extends to a side of the diaphragm assembly 21 away from the liquid crystal panel 21 in the direction away from the first reflective portion 241.

In an embodiment, the reflective layer 24 may be in the structure of a sheet shape or a plate shape. The first reflective portion 241 of the reflective layer 24 can be attached to the bottom plate 221 by bonding or the like. The second reflective portion 241 of the reflective layer 24 is attached to the side plate 222 or has a gap 41 with the side plate 222. The first reflective portion 241 and the second reflective portion 242 may be an integrated structure or a structure in which the two are connected, as long as the reflective layer 24 can shield the surface of the back plate 22 located in the cavity 4, and the effect of reflecting light can be further achieved.

Figure 6:
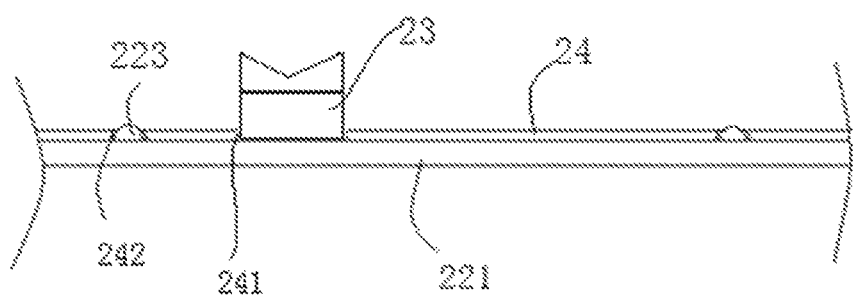
FIG. 6 is a structure schematic view of a reflective layer mating with a light source in an embodiment of the present disclosure.

The light source 23 is extended out of the reflective layer 24 and is exposed to cavity 4, that is to say, the light source 23 is not shielded by the reflective layer 24. As shown in FIG. 6, the position of the reflective layer 24 corresponding to the light source 23 is provided with a through hole 241. The shape and size of the through hole 241 are matched with the light source 23, so that the light source 23 is passed from the back plate 22 to be exposed to the cavity 4. The number of the through hole 241 is the same as the number of the light source 23, and each light source 23 is corresponded to each through hole 241 one by one. The reflective layer 23 is used to reflect light to the diaphragm assembly 21, which improves the utilization of light and the brightness.

As shown in FIG. 6, in order to facilitate the positioning of the reflective layer 24, the surface of the back plate 22 near the diaphragm assembly 21 may be provided with protrusions. For example, the bottom plate 221 of the back plate 22 may be provided with a protrusion 223. The reflective layer 24 can be provided with a positioning hole 242. The protrusion 223 is fitted in the positioning hole 242 to position the reflective layer 24.

Of course, the reflective layer 24 may also be a coating of a reflective material coated on the back plate 22, or may be a film of a reflective material attached on the inner surface of the back plate 22.

In another embodiment, instead of providing a light source, the natural light is utilized as the light source. In the embodiment, the back plate 22 may be adopted as a light transmitting material.

As shown in FIG. 3, the display device in the embodiment of the present disclosure further includes a side frame 3 configured to surround the liquid crystal panel 1 and the diaphragm assembly 21, and one side thereof is connected with the other side of the supporting plate 2221 protruding from the periphery of the diaphragm assembly 21 and the liquid crystal panel 1. In an embodiment, the side frame 3 and the back plate 22 may be of an integrated structure.

The display device of the embodiment of the present disclosure is not needed to fix the diaphragm assembly 21 through the middle frame, so that the edge of the side frame 3 away from the back plate 22 is not needed to extend to the light exit surface 12 of the liquid crystal panel 1 to shield the middle frame. Thus, the width of the side frame 3 is reduced, which is advantageous for achieving a narrow side frame or even no side frame.

The display device of the embodiment of the present disclosure may be used for a display of a computer, a mobile phone screen, or a television, etc., and is not particularly limited herein.

In summary, in a display device of the present disclosure, since the light incident surface 11 of the liquid crystal panel 1 is attached with the diaphragm assembly 21, the light entering the light incident surface 11 can be more uniform through the diaphragm assembly 21, so that the display brightness of the liquid crystal panel 1 is more uniform. Meanwhile, the diaphragm assembly 21 can be limited by the liquid crystal panel 1 to prevent the diaphragm assembly 21 from warping, thereby ensuring that the display brightness of the display panel is more uniform. In addition, since the diaphragm assembly 21 is attached and fixed to the light incident surface 11 of the liquid crystal panel 1, and one end of the side plate 222 is extended to a side of the diaphragm assembly 21 away from the liquid crystal panel to support the diaphragm assembly 21, therefore the diffusion plate and the middle frame in the related art can be omitted, thereby reducing the thickness of the display device, and the side frame is not needed to shield the middle frame again, which is advantageous for reducing the width of the frame. In addition, the elimination of the diffusion plate is also advantageous in avoiding the loss of light from the diffusion plate, and is advantageous for improving the brightness of the display device.

After considering the specification and practicing the disclosure herein, it will be understandable for those skilled in the art to think of the other implementations of the disclosure. The application intends to cover any variants, usage, or changes of adaptation of the present disclosure. These variants, usage, or changes of adaptation follow the general principles of the present disclosure, and include common sense or common technical means in the technical field not disclosed by the disclosure. The specification and embodiments are only exemplary, and the true scope and spirit of the present disclosure are defined by the appended claims.

What is claimed is:

1. A display device, comprising:
   a liquid crystal panel having a light incident surface and a light exit surface which are oppositely disposed;
   a diaphragm assembly, of which one surface near the liquid crystal panel is directly and completely attached to and fixed to the light incident surface of the liquid crystal panel, the diaphragm assembly being configured to at least diffuse light entering the light incident surface, and an area of a surface of the diaphragm assembly near the liquid crystal panel being the same as an area of the light incident surface of the liquid crystal panel such that an edge of the diaphragm assembly is flush with an edge of the liquid crystal panel;
   a back plate disposed at a side of the diaphragm assembly away from the light incident surface of the liquid crystal panel, and being configured to support the diaphragm assembly, the back plate comprising:
      a bottom plate configured to be a flat plate structure, and oppositely disposed with the diaphragm assembly;
      a side plate configured to surround the bottom plate connected with a periphery of the bottom plate, and configured to extend to a side of the diaphragm assembly away from the liquid crystal panel in the direction toward the diaphragm assembly to support the diaphragm assembly;
      a supporting plate configured to contact a surface of the diaphragm assembly away from the liquid crystal panel to support the diaphragm assembly, wherein a first side of the supporting plate is connected with a periphery of a side of the side plate away from the bottom plate, and a second side of the supporting plate protrudes from a periphery of the diaphragm assembly and the liquid crystal panel; and
      a protrusion provided on a surface of the back plate near the diaphragm assembly.

2. The display device according to claim 1, wherein the diaphragm assembly comprises a diffusion sheet and a prism sheet which are disposed to stack.

3. The display device according to claim 2, wherein the diffusion sheet comprises a first substrate and a diffusion layer which are disposed to stack, and the diffusion layer comprises diffusion particles.

4. The display device according to claim 3, wherein a thickness of the first substrate is from 100 μm to 125 μm and a thickness of the diffusion layer is from 20 μm to 40 μm.

5. The display device according to claim 2, wherein the prism sheet comprises a second substrate and a prism layer which are disposed to stack, the prism layer comprising a plurality of prism units protruded toward the light incident surface.

6. The display device according to claim 5, wherein a thickness of the second substrate is from 100 μm to 125 μm and a height of the prism unit is from 20 μm to 40 μm.

7. The display device according to claim 1, wherein the side plate is configured to be a flat plate structure or an arc shape plate structure protruded in a direction away from the bottom plate.

8. The display device according to claim 1, wherein an intersection angle between the side plate and the bottom plate is an obtuse angle.

9. The display device according to claim 1, wherein the bottom plate, the side plate, and the diaphragm assembly are together limited in a cavity.

10. The display device according to claim 9, further comprising: a light source disposed on a surface of the back plate near to the diaphragm assembly and located in the cavity.

11. The display device according to claim 10, further comprising: a reflective layer disposed in the cavity, the reflective layer comprising:
- a first reflective portion attached to a surface of the bottom plate near the diaphragm assembly; and
- a second reflective portion having a first side connected with a periphery of the first reflective portion and a second side being configured to extend to a side of the diaphragm assembly away from the liquid crystal panel in a direction away from the first reflective portion.

12. The display device according to claim 11, wherein the second reflective portion is attached to the side plate or has a gap with the side plate.

13. The display device according to claim 12, wherein a through hole is disposed at a position of the reflective layer corresponding to the light source to expose the light source in the cavity through the light source passing through the through hole.

14. The display device according to claim 1, further comprising a side frame configured to surround the liquid crystal panel and the diaphragm assembly, a side of the side frame being connected with the other side of the supporting plate extending out the periphery of the diaphragm assembly and the liquid crystal panel.

15. A method, comprising providing the display device according to claim 1.

* * * * *